(12) United States Patent
Tohara et al.

(10) Patent No.: US 9,825,474 B2
(45) Date of Patent: Nov. 21, 2017

(54) SECONDARY BATTERY SYSTEM WITH PLURAL BATTERIES AND METHOD OF DISTRIBUTING CHARGE/DISCHARGE POWER

(71) Applicant: Kabushiki Kaisha Toshiba, Minato-ku (JP)

(72) Inventors: Masahiro Tohara, Fuchu (JP); Yoshito Sameda, Yokohama (JP); Mami Mizutani, Hachioji (JP); Tamotsu Endo, Koto (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 109 days.

(21) Appl. No.: 14/773,144

(22) PCT Filed: Mar. 3, 2014

(86) PCT No.: PCT/JP2014/055232
§ 371 (c)(1),
(2) Date: Sep. 4, 2015

(87) PCT Pub. No.: WO2014/136705
PCT Pub. Date: Sep. 12, 2014

(65) Prior Publication Data
US 2016/0013670 A1 Jan. 14, 2016

(30) Foreign Application Priority Data
Mar. 4, 2013 (JP) .................................. 2013-042347

(51) Int. Cl.
*H02J 7/00* (2006.01)
*H01M 10/44* (2006.01)
(Continued)

(52) U.S. Cl.
CPC ......... *H02J 7/0021* (2013.01); *H01M 10/441* (2013.01); *H01M 10/46* (2013.01);
(Continued)

(58) Field of Classification Search
CPC ...... H02J 2007/004; H02J 7/0013; H02J 3/32; H02J 1/102; H02J 2007/0037;
(Continued)

(56) References Cited

U.S. PATENT DOCUMENTS 6,614,233 B2 * 9/2003 Sugimoto .......... G01R 31/3658
324/434
6,741,065 B1 5/2004 Ishii et al.
(Continued)

FOREIGN PATENT DOCUMENTS

EP 2 738 908 A1 6/2014
JP 2001045673 A * 2/2001 .......... B60L 11/1816
(Continued)

OTHER PUBLICATIONS

Korean Office Action dated Mar. 16, 2016 in Patent Application No. 10-2015-7021555 (with English translation).
(Continued)

*Primary Examiner* — Helen Rossoshek
(74) *Attorney, Agent, or Firm* — Oblon, McClelland, Maier & Neustadt, L.L.P.

(57) ABSTRACT

A secondary battery system including plural batteries, extends the lifetime of each battery, and improves the charge/discharge (energy) efficiency of a whole system is provided. A secondary battery system includes plural batteries individually controllable for charging/discharging, plural PCSs each connected to the corresponding battery and performing charging/discharging to the connected battery, and a battery controller distributing a charge/discharge power value as a whole system to each of the PCSs at a fixed
(Continued)

EXAMPLE CHARACTERISTIC OF BATTERY (TYPE A)

cycle or an arbitrary timing. The battery controller includes a preference order calculator setting a preference order to the plural batteries at each time point based on a deterioration characteristic of each battery related to each SOC thereof, and a distribution rate determining unit distributing the charge/discharge power value to the PCSs in accordance with the preference order.

11 Claims, 11 Drawing Sheets

(51) Int. Cl.
  *H01M 10/46* (2006.01)
  *H01M 10/48* (2006.01)
(52) U.S. Cl.
  CPC ............ *H02J 7/007* (2013.01); *H02J 7/0018* (2013.01); *H02J 7/0019* (2013.01); *H02J 7/0078* (2013.01); *H01M 10/48* (2013.01); *Y02B 40/90* (2013.01); *Y02E 70/40* (2013.01)
(58) Field of Classification Search
  CPC ....... H02J 2007/0059; H02J 2007/0067; H02J 50/80; H02J 7/0026; H02J 7/0014; H02J 7/0024; H02J 7/1423; H02J 7/1469; Y02T 10/7044; B60L 11/1861; B60L 11/1864; B60L 11/1868; B60L 11/1811; B60L 11/1859; B60L 5/2045
  See application file for complete search history.

(56) References Cited

U.S. PATENT DOCUMENTS

| | | | | |
|---|---|---|---|---|
| 7,045,989 B2* | 5/2006 | Sakakibara | ........... | H02J 7/0026 320/106 |
| 7,176,656 B2* | 2/2007 | Feldmann | ............ | H02J 7/0014 320/112 |
| 7,193,392 B2* | 3/2007 | King | ................... | B60L 11/185 320/118 |
| 7,564,217 B2* | 7/2009 | Tanigawa | ............. | H02J 7/0026 320/118 |
| 7,797,958 B2* | 9/2010 | Alston | ............... | B60H 1/00428 165/43 |
| 7,830,117 B2* | 11/2010 | Ambrosio | ............ | B60L 3/0046 320/109 |
| 7,971,345 B2* | 7/2011 | Okumura | ............. | H01M 10/44 29/730 |
| 8,547,065 B2* | 10/2013 | Trigiani | ................ | H02J 7/0018 320/118 |
| 8,732,896 B2* | 5/2014 | Lucas | ................... | A01D 34/78 15/319 |
| 8,736,229 B2* | 5/2014 | Kawahara | ............ | B60L 3/0046 320/116 |
| 2009/0218986 A1* | 9/2009 | Jarvinen | ............... | B60L 11/185 320/119 |
| 2010/0121511 A1* | 5/2010 | Onnerud | ............ | B60L 11/1851 701/22 |
| 2011/0031050 A1* | 2/2011 | Bradley | ........... | G08G 1/096775 180/65.22 |
| 2011/0300415 A1* | 12/2011 | Kumagai | ............... | H02J 7/0021 429/7 |
| 2012/0032638 A1* | 2/2012 | Jung | ...................... | B60L 3/0046 320/112 |
| 2012/0133333 A1 | 5/2012 | Morioka et al. | | |
| 2012/0139495 A1* | 6/2012 | Nortman | ............... | H02J 7/0016 320/128 |
| 2012/0212183 A1* | 8/2012 | Yamada | ..................... | H02J 3/32 320/126 |
| 2012/0301803 A1* | 11/2012 | Wake | ...................... | B60L 1/003 429/429 |
| 2012/0306451 A1* | 12/2012 | Arai | ..................... | H01M 10/425 320/134 |
| 2012/0319659 A1* | 12/2012 | Kinoshita | ............. | H01M 4/525 320/134 |
| 2013/0069429 A1* | 3/2013 | Yang | ........................ | H04Q 9/00 307/23 |
| 2013/0154570 A1* | 6/2013 | Nomura | ..................... | H02J 3/32 320/128 |
| 2013/0175975 A1* | 7/2013 | Shinozaki | ........... | B60L 11/1864 320/106 |
| 2014/0111163 A1 | 4/2014 | Yamauchi et al. | | |
| 2014/0167657 A1 | 6/2014 | Nishikawa | | |
| 2014/0197686 A1 | 7/2014 | Hiramura et al. | | |
| 2014/0266061 A1* | 9/2014 | Wachal | ................. | H02J 7/0068 320/134 |
| 2016/0141894 A1* | 5/2016 | Beaston | ................ | H02J 7/0014 320/103 |

FOREIGN PATENT DOCUMENTS

| | | |
|---|---|---|
| JP | 2003-297435 A | 10/2003 |
| JP | 2008-118790 A | 5/2008 |
| JP | 2008-182810 A | 8/2008 |
| JP | 2011-177025 A | 9/2011 |
| JP | 2012-168073 A | 9/2012 |
| JP | 2012-210039 A | 10/2012 |
| JP | 2012-249484 A | 12/2012 |
| JP | 2013-31281 A | 2/2013 |
| JP | 2013-247726 A | 12/2013 |
| JP | 2014-17982 A | 1/2014 |
| KR | 10-2012-0136114 A | 12/2012 |
| WO | WO 2010/084599 A1 | 7/2010 |
| WO | WO 2011/016273 A1 | 2/2011 |
| WO | WO 2012/111234 A1 | 8/2012 |
| WO | WO 2012/165300 A1 | 12/2012 |
| WO | WO 2012/176868 A1 | 12/2012 |
| WO | WO 2013/014930 A1 | 1/2013 |

OTHER PUBLICATIONS

International Search Report dated Apr. 28, 2014 in PCT/JP2014/055232 (submitting English translation only).

Extended European Search Report dated Jul. 20, 2016 in Patent Application No. 14760676.8.

* cited by examiner

EXAMPLE CHARACTERISTIC OF BATTERY (TYPE A)

*Fig. 4A*

EXAMPLE CHARACTERISTIC OF BATTERY (TYPE B)

*Fig. 4B*

EXAMPLE CHARACTERISTIC OF BATTERY (TYPE A)

*Fig. 5A*

EXAMPLE CHARACTERISTIC OF BATTERY (TYPE B)

SECONDARY BATTERY SYSTEM WITH PLURAL BATTERIES AND METHOD OF DISTRIBUTING CHARGE/DISCHARGE POWER

TECHNICAL FIELD

Embodiments of the present disclosure relates to a secondary battery system that includes plural batteries individually controllable for charging/discharging, and a method of distributing charge/discharge power or a current (hereinafter, referred to as charge/discharge power, etc.) which utilizes the secondary battery system.

BACKGROUND ART

A large-scale electricity storage system with secondary batteries is expected to be utilized in applications such as a suppression of power generation fluctuation which utilizes natural energies like solar light and wind power, a suppression of a power demand fluctuation, and a peak shift. In order to construct such a large-scale electricity storage system, cases in which plural batteries individually controllable for charge/discharge power, etc. (sub battery system: hereinafter, simply referred to as "batteries"), are utilized in combination will increase. According to such a system constructed by plural batteries, it is important how to distribute, to the individual batteries that construct the electricity storage system, an instruction value for charge/discharge power, etc., relative to the whole electricity storage system.

RELATED TECHNICAL DOCUMENTS

Patent Documents

[Patent Document 1] JP 2008-118790 A
[Patent Document 2] JP 2011-177025 A
[Patent Document 3] JP 2012-210039 A

SUMMARY

Technical Problem

According to secondary battery systems that include, a plurality of, and in particular, a wide variety of batteries individually controllable for charging/discharging, when the charge/discharge power is not appropriately distributed to the individual batteries, each battery is deteriorated quickly, and the charge/discharge energy efficiency of a whole system decreases. For example, typical lead batteries have the deterioration advanced in a low SOC (State of Charge: remaining battery level), while lithium-ion batteries have the deterioration advanced in a high SOC. Hence, when the SOC region where those batteries stay for a long time is not appropriately taken into consideration, those batteries often become short-lived.

In addition, at the time of a low-load operation at which the charge/discharge power of a whole system is quite low relative to the rated power, when the charge/discharge power is evenly distributed to all batteries, the operation is performed in a low-efficiency region of a PCS (Power Conditioning System: power converter), resulting in a decrease of the energy efficiency.

It is an objective of embodiments of the present disclosure to provide a secondary battery system which includes plural batteries, can extend the lifetime of each battery and can also improve the charge/discharge (energy) efficiency of the whole system, and, a method of distributing charge/discharge power, etc., which utilizes the secondary battery system.

Solution to Problem

To accomplish the above objective, a secondary battery system according to embodiments of the present disclosure includes:

a plurality of batteries individually controllable for charging/discharging;

a plurality of charging/discharging devices each connected with the corresponding battery, and performing charging/discharging to the connected battery; and a battery controller distributing, to each of the charging/discharging devices, a charge/discharge power value or a current value as a whole system at a fixed cycle or at an arbitrary timing, the battery controller comprising:

a preference order calculator setting a preference order to the plurality of batteries at each time point based on a deterioration characteristic of each battery related to an SOC thereof; and a distribution rate determiner distributing the charge/discharge power value or the current value to the charging/discharging devices in accordance with the reference order.

In addition, a method of distributing charge/discharge power, etc., according to embodiments of the present disclosure comprises:

a plurality of batteries individually controllable for charging/discharging;

a plurality of charging/discharging devices each connected with the corresponding battery, and performing charging/discharging to the connected battery; and a battery controller distributing, to each of the charging/discharging devices, a charge/discharge power value or a current value as a whole system at a fixed cycle or at an arbitrary timing, wherein the battery controller sets a preference order to the plurality of batteries at each time point based on a deterioration characteristic of each battery related to an SOC thereof, and distributes the charge/discharge power value or the current value to the charging/discharging devices in accordance with the preference order.

BRIEF DESCRIPTION OF DRAWINGS

FIGS. 3A and 3B are graphs for explaining a method of obtaining a charge necessity characteristic, and FIG. 3A shows a relationship between an SOC and a deterioration speed, while FIG. 3B shows a relationship between the SOC and a charge necessity;

FIG. 4A is for a type A battery (lithium-ion battery), while FIG. 4B is for a type B battery (lead battery);

FIG. 5A is for the type A battery, while FIG. 5B is for the type B battery;

DESCRIPTION OF EMBODIMENTS

Embodiments of the present disclosure will be explained below in detail with reference to the figures.

(Structure of Secondary Battery System)

Figure 1:
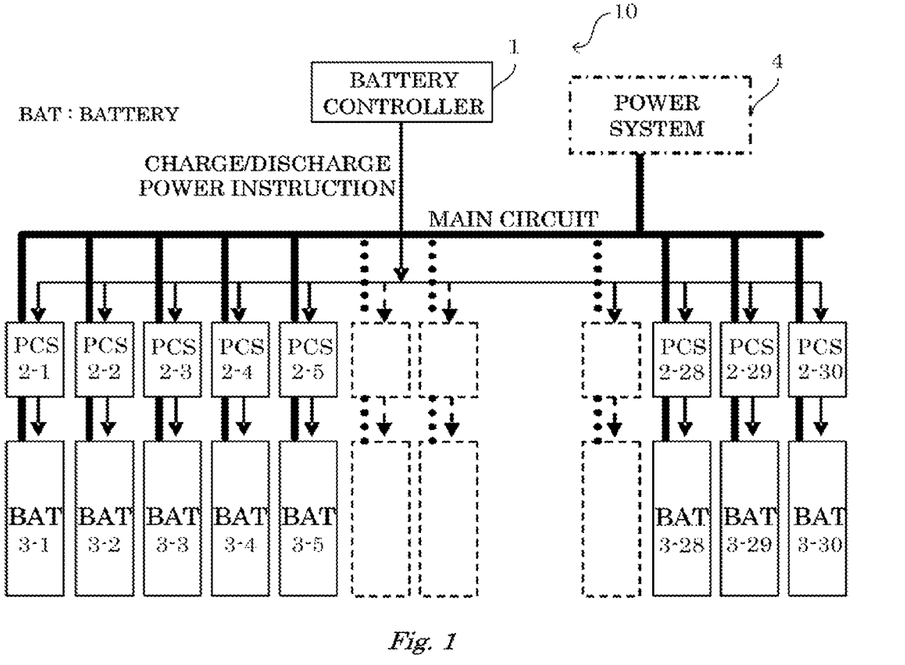
FIG. 1 is a schematic diagram illustrating a structure of a secondary battery system according to an embodiment of the present disclosure.

FIG. 1 illustrates a structure of a secondary battery system according to an embodiment of the present disclosure.

A secondary battery system 10 includes a battery controller 1 that distributes charge/discharge power to individual batteries, plural (e.g., 30 units) PCSs 2-1 to 2-30 which are connected to respective batteries and which perform charging/discharging to the connected batteries, and plural (e.g., 30 units) batteries 3-1 to 3-30 which are provided so as to correspond to the respective PCSs 2-1 to 2-30, and which can perform charging/discharging. In this secondary battery system 10, a wide variety of batteries 3-1 to 3-30 are connected the respective DC sides of the corresponding PCSs 2-1 to 2-30, and the respective AC sides of all PCSs 2-1 to 2-30 are connected in parallel one another and also interconnected with a power system 4. In addition, all PCSs 2-1 to 2-30 are connected with the battery controller 1.

(Structure of Battery Controller 1)

Figure 2:
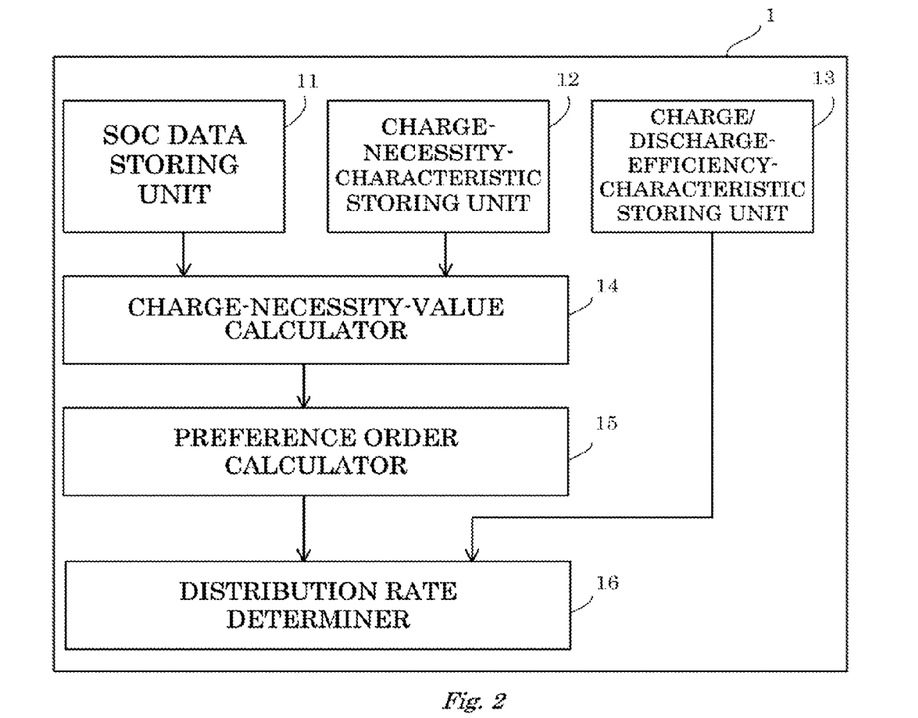
FIG. 2 is a block diagram illustrating a detailed structure of a battery controller according to the embodiment.

FIG. 2 illustrates a detailed structure of the battery controller 1.

The battery controller 1 includes an SOC data storing unit 11, a charge-necessity-characteristic storing unit 12, a charge/discharge-efficiency-characteristic storing unit 13, a charge-necessity-value calculator 14, a preference order calculator 15, and a distribution rate determiner 16. The battery controller 1 determines, for each fixed cycle (e.g., for each one minute), the preference order of distribution to the batteries 3-1 to 3-30 by those units, and determines the distribution of charge/discharge power in accordance with this preference order.

(SOC Data Storing Unit 11)

The SOC data storing unit 11 obtains and stores data on the SOC (State of Charge: remaining battery level) of each of the batteries 3-1 to 3-30 at an arbitrary time point, and data on a temperature at that time point.

(Charge-Necessity-Characteristic Storing Unit 12)

The charge-necessity-characteristic storing unit 12 stores, in the form of, for example, a table, data on a charge necessity characteristic relative to each value of the SOC and that of a temperature for each battery 3-1 to 3-30. The charge necessity characteristic will be explained below.

The charge necessity characteristic is a characteristic utilized for the purpose of suppressing a deterioration and extending the lifetime, and represents the necessity of charging so as not to cause the target battery to deteriorate as much as possible. This charge necessity characteristic is a characteristic value based on a deterioration speed characteristic relative to each value of the SOC for each of the batteries 3-1 to 3-30 and that of a temperature. Accelerated lifetime tests, etc., were carried out beforehand under various conditions, and the charge necessity characteristic is created based on the deterioration speed characteristic obtained as the results of the tests. The deterioration factors of batteries include a calendar deterioration and a charge/discharge cycle deterioration, and the charge necessity characteristic corresponds to the calendar deterioration. The charge necessity characteristic becomes a positive value when the deterioration speed decreases at a higher SOC side than the current SOC, and becomes a negative value when the deterioration speed decreases at a lower SOC side than the current SOC. That is, the charge-necessity-characteristic curve at a certain temperature becomes a characteristic similar to a characteristic that has an inverted symbol of the derivative value of the deterioration speed curve at that temperature.

Figure 3A:
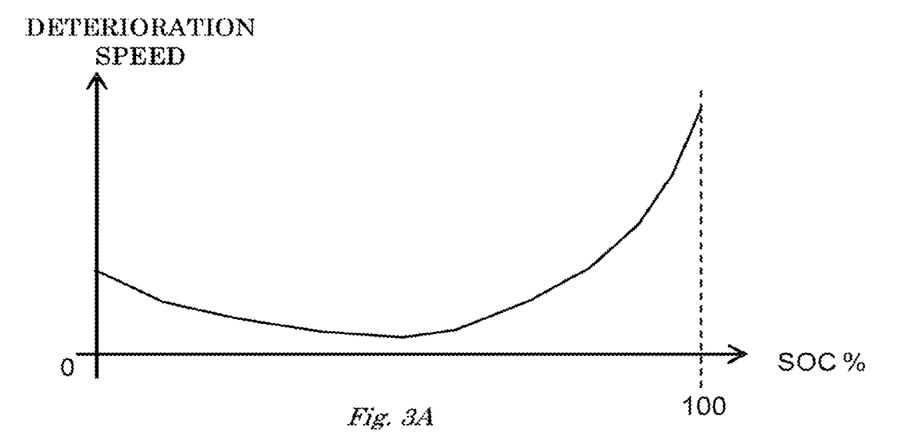
Figure 3B:
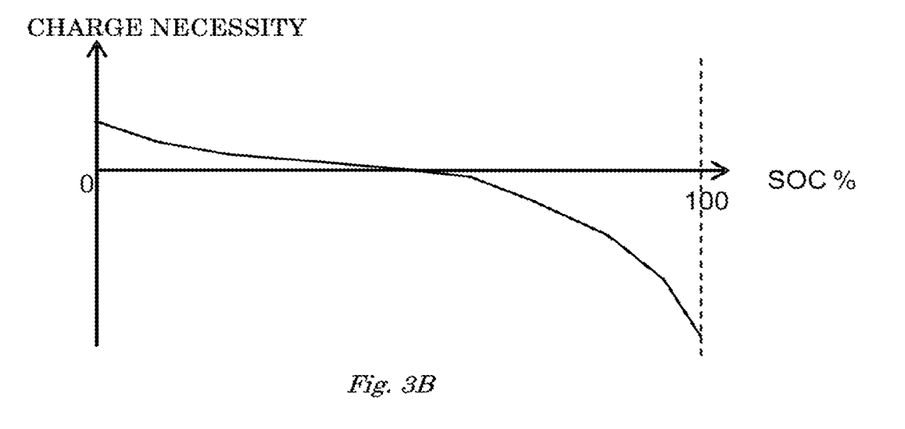

A specific method of obtaining the charge necessity characteristic of each battery is, as illustrated in FIG. 3A, to create a graph of the SOC and the deterioration speed (e.g., a capacity reduction rate per a unit time) based on the calendar deterioration test result of this battery, to differentiate this graph with reference to the SOC, and to apply the resultant that has an inverted symbol. This is because, when the derivative value of the deterioration speed with respect to the SOC is positive, the more the SOC increases, the faster the deterioration becomes, and thus the charge necessity characteristic becomes negative (which indicates that discharging is desirable), and, when the derivative value of the deterioration speed with respect to the SOC is negative, the more the SOC increases, the slower the deterioration becomes, and thus the charge necessity characteristic becomes positive (which indicates that charging is desirable). A relationship between the SOC and the charge necessity obtained in consideration of the above-explained scheme is illustrated in FIG. 3B.

Figure 4A:
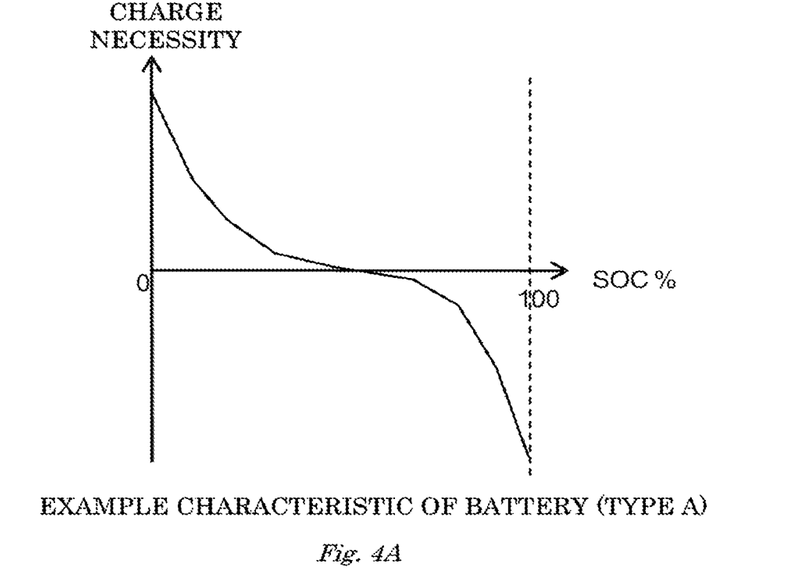
FIGS. 4A and 4B are graphs showing a relationship between the SOC and a charge necessity for a specific type of battery.
Figure 4B:
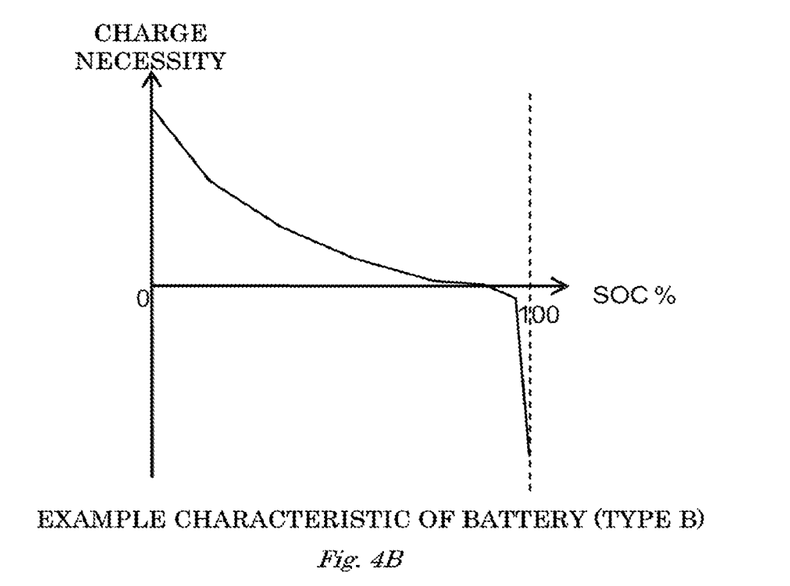

In addition, FIGS. 4A and 4B illustrate a relationship between the SOC and the charge necessity for a specific type of battery. In the case of typical lithium-ion batteries, since the deterioration is likely to be advanced at the high SOC side, as illustrated in FIG. 4A, the charge necessity characteristic draws a curve toward the further negative side as it goes toward the high SOC side (that is, charging should be avoided as much as possible so as not to enter this region). In addition, in view of the deterioration, since the characteristic is not always good at the low SOC side, as illustrated in FIG. 4A, the charge necessity characteristic draws a curve that enters the positive side at the low SOC side (charging should be performed as much as possible so as to leave this region).

In contrast, in the case of typical lead batteries, the deterioration is minimized at the fully charged condition, and the deterioration speed increases toward the low SOC side. Hence, as illustrated in FIG. 4B, the charge necessity characteristic has a curve located at the positive side throughout substantially entire SOC region, and becomes a large value at the low SOC side. In addition, as for lead batteries, it is desirable that such batteries should be always fully charged in consideration of the deterioration only (that is, the charge necessity characteristic becomes zero when SOC is 100%). However, in order to ensure the reserve capacity for charging/discharging that is the original purpose of battery installation, acceptance of charging is not permitted in the fully charged condition, and as illustrated in FIG. 4B, a portion of the characteristic curve near the 100-% SOC is set as a negative value, and thus the desirable stand-by condition is set at an SOC position slightly lower than the fully charged condition.

(Charge/Discharge-Efficiency-Characteristic Storing Unit 13)

The charge/discharge-efficiency-characteristic storing unit 13 stores a charge/discharge efficiency characteristic obtained as a result of an efficiency characteristic test performed beforehand for the respective batteries 3-1 to 3-30. The charge/discharge efficiency characteristic will be explained below.

The charge/discharge efficiency characteristic is utilized for the purpose of reducing a loss and improving the efficiency.

Figure 5A:
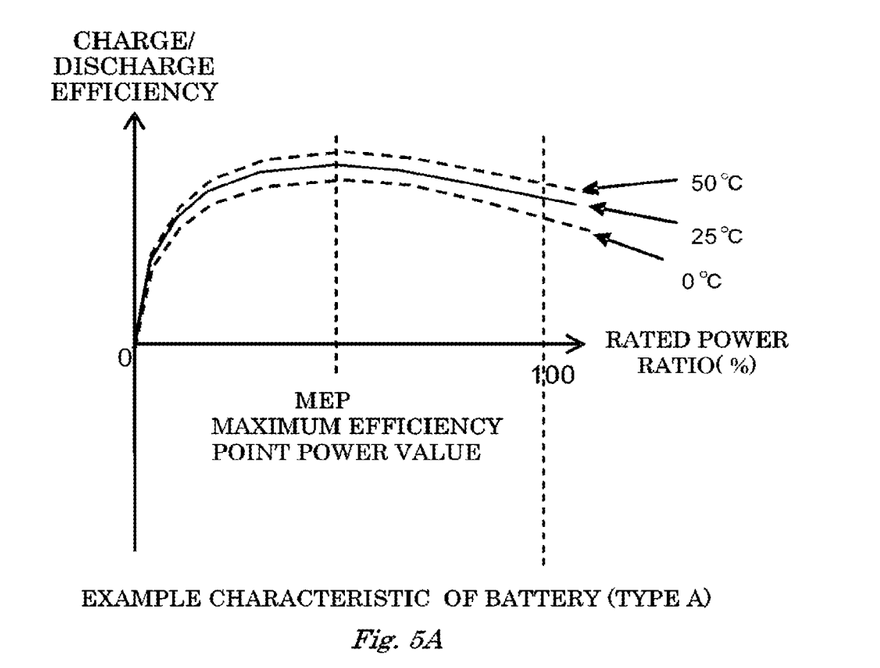
FIGS. 5A and 5B are graphs showing a relationship between a charge/discharge power value expressed as a rated power ratio for a specific type of battery (including a PCS) and a charge/discharge efficiency.
Figure 5B:
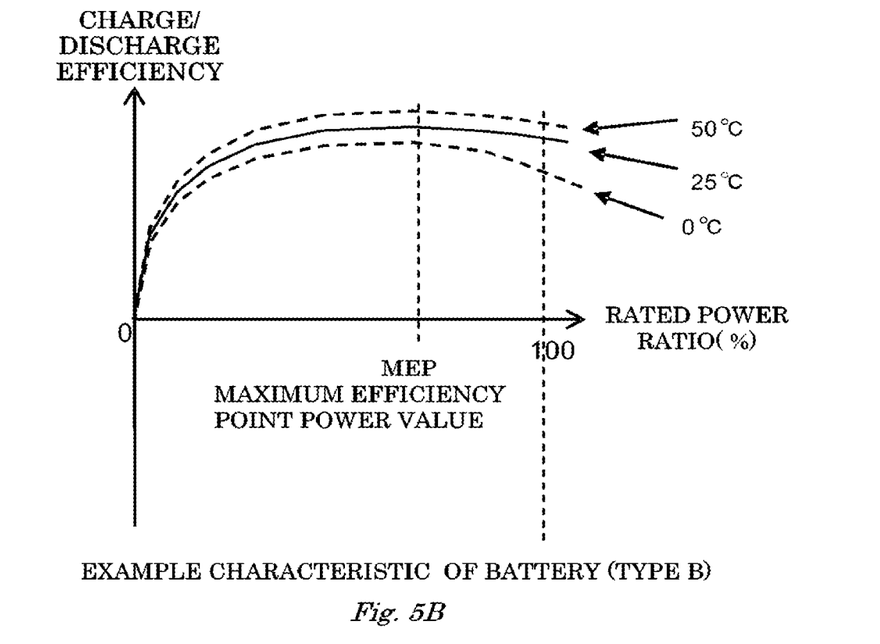

FIGS. 5A and 5B illustrate a relationship between a charge/discharge power value expressed as a rated power ratio and a charge/discharge efficiency for the specific type of batteries. The charge/discharge efficiency shows the charge/discharge energy rate for a set of each of the batteries 3-1 to 3-30 and each of the corresponding PCS 2-1 to 2-30, i.e., a rate of energy (Wh) that can be taken out by discharging from charged energy.

Both FIGS. 5A and 5B show the maximum efficiency point power value (MEP: Maximum Efficiency Point) located somewhere in the intermediate region between 0% and 100% in rated power ratio. This is because that the Joule loss by the resistance component including the internal resistance of the battery increases in proportional to the square of a current within the high output region, but the influence by what corresponds to the self-consumption power by the control circuit, etc., relatively increases within the low output region.

(Charge Necessity Value Calculator 14)

The charge necessity value calculator 14 obtains, for each of the battery 3-1 to 3-30, the unique charge necessity characteristic from the charge-necessity-characteristic storing unit 12, and obtains data of the SOC at that time point from the SOC data storing unit 11, thereby calculating the charge necessity value.

(Preference Order Calculator 15)

The preference order calculator 15 utilizes, in the setting of the preference order for the batteries 3-1 to 3-30, the "charge necessity characteristic" value predefined for each type of the batteries 3-1 to 3-30 and relative to the SOC. That is, the preference order calculator 15 gives a preference order to the battery 3-1 to 3-30 in order of the battery with a higher charge necessity value at the time point when a charge/discharge power value Ptotal (tn) as a whole system is in the charging side, and in order of the battery with a lower charge necessity value at the time point when the charge/discharge power value as a whole system is in the discharging side.

(Distribution Rate Determination Scheme)

After the preference order is set for the distribution target batteries, it is necessary to determine the power value to be distributed to each of the batteries 3-1 to 3-30 in accordance with the set preference order. An example distribution rate determination scheme is to set, with reference to the maximum efficiency point power value (MEP) that is the maximum value in the graph showing a relationship between the rated power ratio and the charge/discharge efficiency in FIG. 6, the power value to be distributed to each of the batteries 3-1 to 3-30 to a value between the MEP in FIG. 6 and an MPP (Maximum Power Point: maximum chargeable/dischargeable power value).

Figure 6:
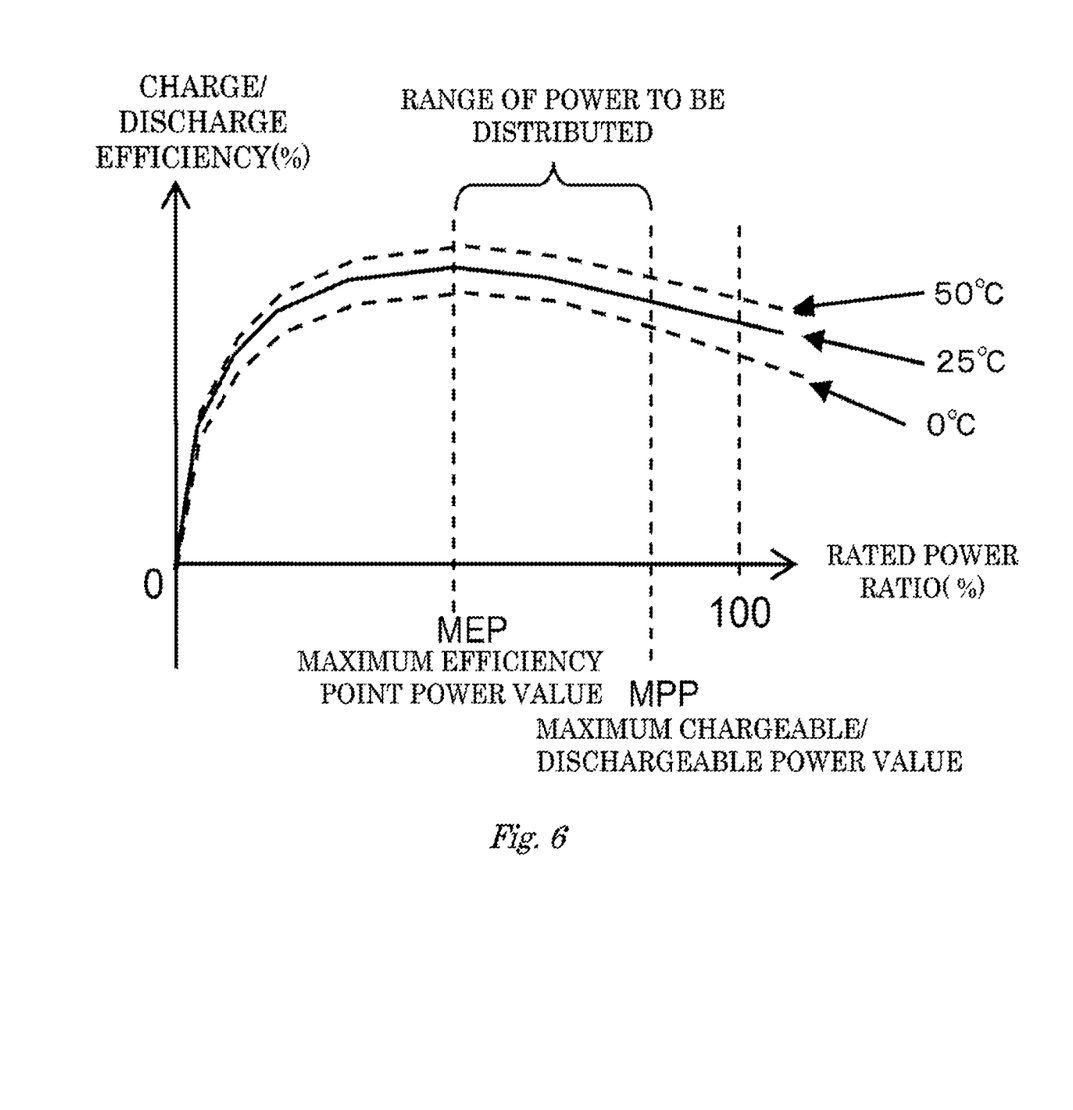
FIG. 6 is a graph for explaining a range of power to be distributed.

According to this scheme, when the charge/discharge instruction value as a whole system is larger than a total value of the MEPs of the respective batteries, a value between the MEP and the MPP can be distributed to each of the batteries 3-1 to 3-30. Conversely, when the charge/discharge instruction value as a whole system is smaller than the total value of the MEPs of the respective batteries, if the amount of distribution to the last battery for distributing the last charge/discharge instruction value is lower than the MEP, and the amount of last distribution cannot be additionally distributed to the battery previous to the last battery and having already undergone the distribution, only the last battery has the distribution value lower than the MEP. However, this is not the best scheme in view of the efficiency.

Figure 7:
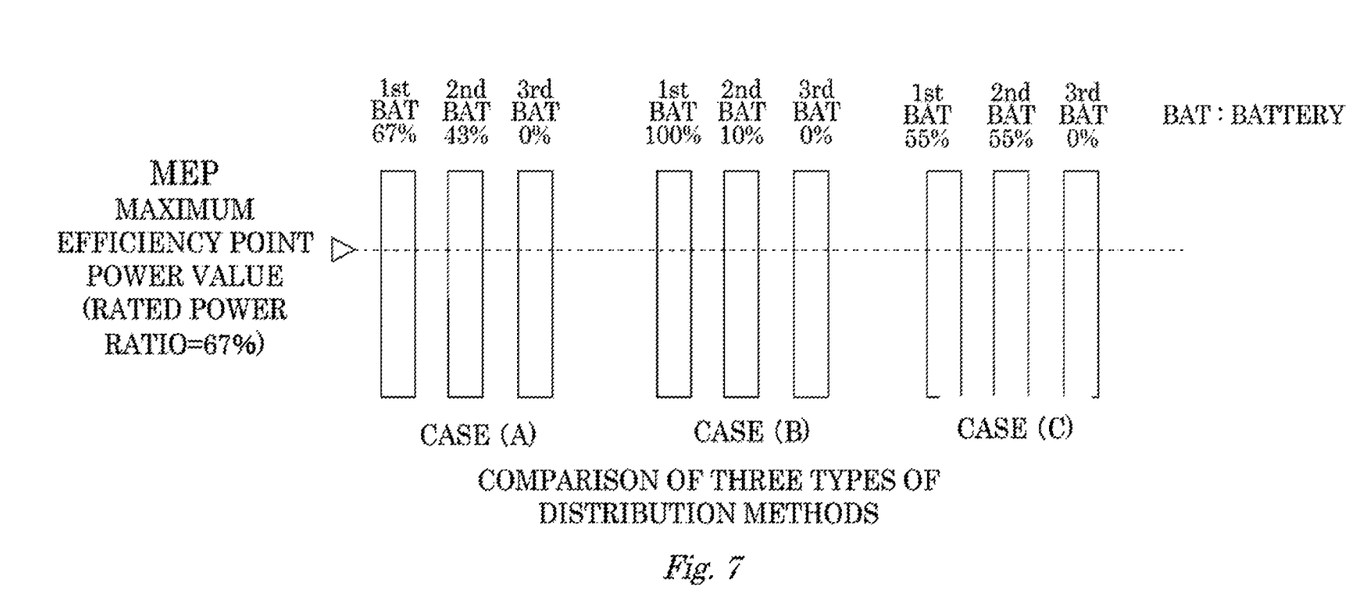
FIG. 7 is a diagram illustrating three example distribution methods when the maximum efficiency point is 67% in rated power ratio.

With respect to this problem, a specific explanation will be given with reference to FIG. 7. In FIG. 7, as for a case in which an instruction value of 11 kW is to be distributed to three batteries each having a rating of 10 kW, three example distributions will be compared one another. In this case, it is assumed that the preference order is set for the three batteries in the order of a first battery, a second battery, and a third battery in accordance with a charge necessity value (NOC). In addition, it is also assumed that, for the details of each battery loss, an amount by what corresponds to a stand-by power requirement is $P_0$, and an amount by what corresponds to a current square proportion is $k \times P_0$. Still further, it is assumed that the maximum efficiency point power of each battery is 67% in rated power ratio.

As a distribution method, in a case (A), 6.7 kW (67%) equivalent to the MEP is distributed to the first battery, and the remaining 4.3 kW (43%) is distributed to the second battery. In a case (B), 10 kW (100%) equivalent to the MPP is distributed to the first battery, and the remaining 1 kW (10%) is distributed to the second battery. In a case (C), 5.5 kW (55%) is distributed to the first battery, while 5.5 kW (55%) is distributed to the second battery so that the power is evenly distributed to both first and second batteries. Table 1 shows calculation results of the respective amounts of loss for those three cases.

TABLE 1

| LOSS | (A) | (B) | (C) |
| --- | --- | --- | --- |
| BY STAND-BY POWER | $2P_0$ | $2P_0$ | $2P_0$ |
| BY CURRENT SQUARE PROPORTION | $k \times 0.45P^2 +$ $k \times 0.185P^2$ | $k \times P^2 +$ $k \times 0.01P^2$ | $k \times 0.30P^2 +$ $k \times 0.30P^2$ |
| TOTAL | $2P_0 + 0.635 \cdot k \cdot P^2$ | $2P_0 + 1.01 \cdot k \cdot P^2$ | $2P_0 + 0.60 \cdot k \cdot P^2$ |

That is, when the power is likewise distributed to the two batteries, it is clear that the case (C) has the minimum loss, and is highly efficient. This is possibly because that the details of the loss contain an amount by what corresponds to the current square proportion, and thus the even distribution in view of the rated power ratio can minimize the lost.

(Distribution Rate Determiner 16)

Table 2 shows a distribution rate determination method by the distribution rate determiner 16 in consideration of the above-explained method.

TABLE 2

| CONDITION | DISTRIBUTION |
|---|---|
| CHARGE/DISCHARGE ΣMPP ≤ POWER INSTRUCTION VALUE | DISTRIBUTE TO ALL CHARGEABLE/DISCHARGEABLE BATTERIES BY RESPECTIVE MPPS (INSTRUCTION VALUE CAN NOT BE FULLY DISTRIBUTED IN CASE OF INEQUALITY SIGN CONDITION) |
| CHARGE/DISCHARGE ΣMEP ≤ POWER < ΣMPP INSTRUCTION VALUE | ONCE DISTRIBUTE TO ALL CHARGEABLE/DISCHARGEABLE BATTERIES BY RESPECTIVE MEPS AMD ADDITIONALLY DISTRIBUTE REMAINING NOT YET DISTRIBUTED TO EACH BATTERY HAVING ALREADY UNDERGONE DISTRIBUTION AT A RATE OF REMAINING AMOUNT(MPP-MEP) |
| CHARGE/DISCHARGE POWER INSTRUCTION < ΣMEP VALUE | DISTRIBUTE TO UPPER n NUMBER OF CHARGEABLE/DISCHARGEABLE BATTERIES IN PREFERENCE ORDER AT A RATE OF MEP n THAT MAXIMIZE EFFICIENCY (RATIO BETWEEN DISTRIBUTION POWER AND MEP CLOSE TO 1) IS EMPLOYED WHEN n IS VARIABLE |

That is, the distribution rate determiner 16 compares the total value of the maximum chargeable/dischargeable powers (MPP) of all batteries 3-1 to 3-30 with the charge/discharge power instruction value of a whole system at this time point, and distributes the power value to all batteries 3-1 to 3-30 by respective maximum chargeable/dischargeable power values (MPP) when the latter value is equal to or larger than the former value. When the latter value is larger than the former value, the instruction value cannot be distributed to all batteries.

In addition, when the charge/discharge power instruction value of a whole system at this time point is smaller than the total value of the respective maximum chargeable/dischargeable power values (MPP) of all batteries 3-1 to 3-30, and is equal to or larger than the total value of the respective maximum efficiency point power values (MEP) of all batteries 3-1 to 3-30, the distribution rate determiner once distributes the power value to all chargeable/dischargeable batteries by respective MEPs, and the remaining power value not distributed yet is additionally distributed to each battery having already undergone the distribution at the rate of each remaining amount (MPP−MEP).

Still further, the distribution rate determiner 16 distributes the power value at the rate of the MEP to the upper n number of chargeable/dischargeable batteries in the preference order when the charge/discharge power instruction value of a whole system at this time point is smaller than the total value of the respective maximum efficiency point power values (MEP) of all batteries 3-1 to 3-30. In this case, as for the number n, a number which can make the ratio between the distribution power and the MEP closest to 1, and which can also accomplish the maximum efficiency is employed.

Figure 8:
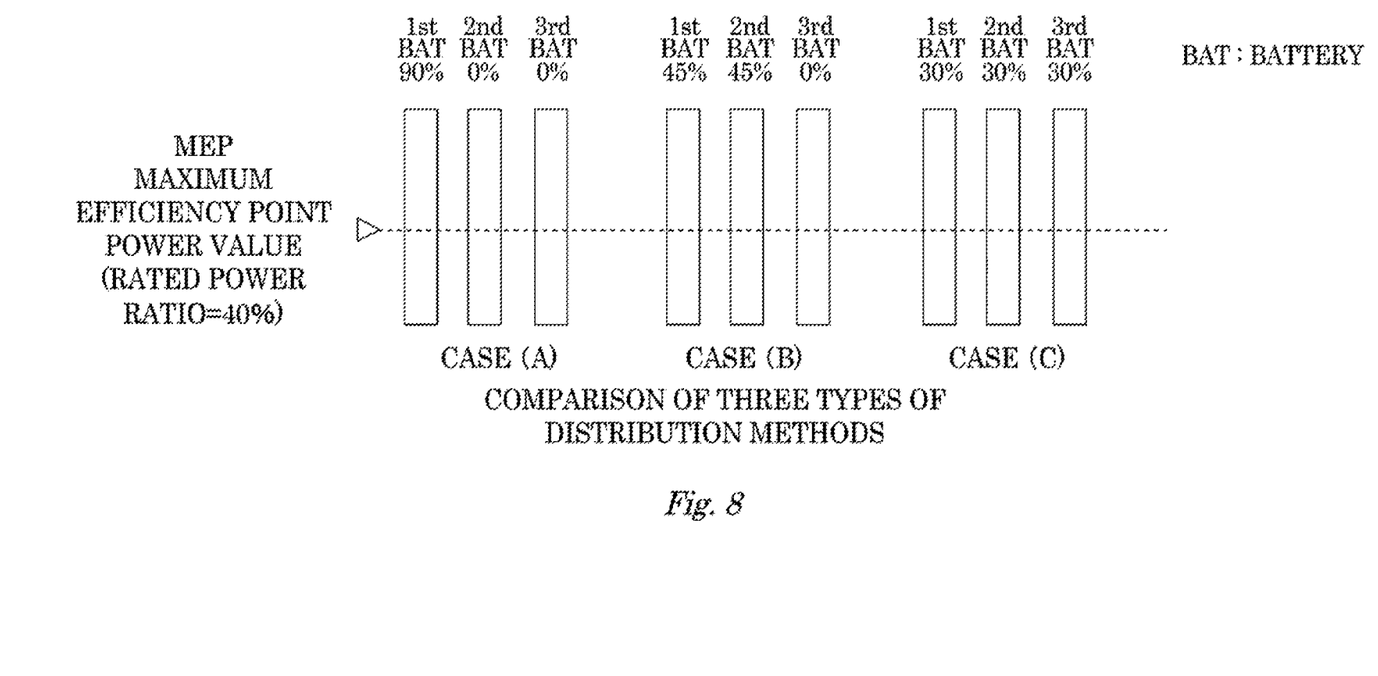
FIG. 8 is a diagram illustrating three example distribution methods when the maximum efficiency point is 40% in rated power ratio.

With respect to this point, a specific explanation will be given with reference to FIG. 8. When the charge/discharge power instruction value of a whole system at this time point is smaller than the total value of the respective maximum efficiency point power values (MEP) of all batteries 3-1 to 3-30, since the charge/discharge power as the system still have remaining amount, it is possible to decrease the number of batteries to which power is distributed. As an example, FIG. 8 illustrates a case (A) in which the power value is distributed to one battery, a case (B) in which the power value is distributed to two batteries, and a case (C) in which the power value is distributed to three batteries, but when the number of batteries to which power value is distributed is a plural number, the distribution is performed in proportional to the MEP. The distribution method that can accomplish the maximum efficiency may be either the case (B) or (C) since the amount of distribution is close to the MEP. In more precise sense, as shown in table 1, the case to be employed is determined by calculating the efficiencies of both cases, but in general, since the efficiency characteristic has a small slope near the MEP, there would be no large difference when either case is employed. Accordingly, the simplest counterplan is to add the power value so as to accomplish an even distribution at the MEP rate up to the previous battery to the last battery like the case (B) in FIG. 8 when the amount of last distribution becomes less than ½ of the MEP of the last battery upon distribution to each battery at the MEP, and when the amount of last distribution is equal to or larger than ½ of the MEP, the power value is distributed evenly at the MEP rate like the case (C) including the last battery.

By performing the above-explained process, a long-term stay in the SOC where the battery deterioration speed is fast and an efficiency reduction at the time of a low-load operation are both accomplished.

(Action)

Figure 9:
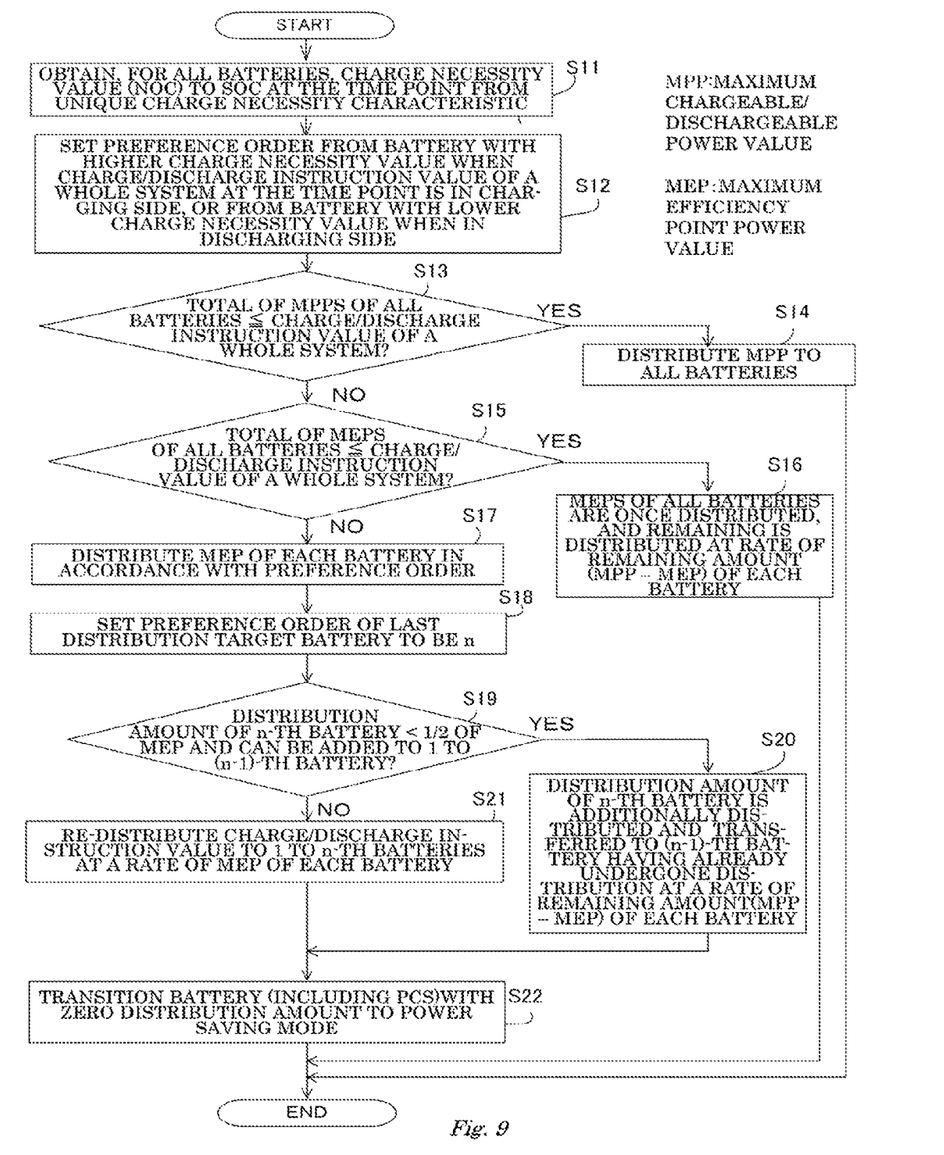
FIG. 9 is a flowchart illustrating a method of distributing charge/discharge power by the secondary battery system of the embodiment.

A charge/discharge power distribution method by the secondary battery system 10 of this embodiment will be explained with reference to FIG. 9.

First, the charge-necessity-value calculator 14 of the battery controller 1 obtains, for all batteries 3-1 to 3-30, unique charge-necessity-characteristic data (characteristic value to each SOC value) from the charge-necessity-characteristic storing unit 12, obtains the SOC at this time point from the SOC data storing unit 11, and calculates the charge necessity value (step S11). Next, the preference order calculator 15 obtains the charge necessity value from the charge-necessity-value calculator 14, and sequentially sets the preference order from the battery with a larger charge necessity value when the charge/discharge power instruction value of a whole system at this time point is in the charging direction, or from the battery with a smaller charge necessity value when in the discharging direction (step S12).

Next, the distribution rate determiner 16 compares, based on the charge/discharge efficiency characteristic for each of the battery 3-1 to 3-30 and obtained from the charge/discharge-efficiency-characteristic storing unit 13, the total value of the respective maximum chargeable/dischargeable power values (MPP) of all batteries 3-1 to 3-30 with the charge/discharge power instruction value of a whole system at this time point (step S13). When the latter value is equal to or larger than the former value (step S13: YES), the maximum chargeable/dischargeable power value (MPP) is distributed to all batteries 3-1 to 3-30 (step S14), and the process is finished.

Conversely, when the total value of the respective maximum chargeable/dischargeable power values (MPP) of all batteries 3-1 to 3-30 is larger than the charge/discharge power instruction value of a whole system at this time point (step S13: NO), the distribution rate determiner 16 compares, based on the charge/discharge efficiency characteristic for each of the batteries 3-1 to 3-30 and obtained from the charge/discharge-efficiency-characteristic storing unit 13, the total value of the respective maximum efficiency point power values (MEP) of all batteries 3-1 to 3-30 with the charge/discharge power instruction value of a whole system at this time point (step S15). When the latter value is equal to or larger than the former value (step S15: YES), the respective maximum efficiency point power values (MEP) are once distributed to all batteries 3-1 to 3-30, and the remaining is distributed at the rate of the remaining amount (MPP−MEP) of each battery (step S16), and the process is finished.

Conversely, when the total value of the respective maximum efficiency point power values (MEP) of all batteries 3-1 to 3-30 is larger than the charge/discharge power instruction value of a whole system at this time point (step S15: NO), the distribution rate determiner 16 distributes the MEP of each battery in the preference order (step S17), and sets the preference order of the last distribution target battery to be n (step S18).

In addition, the distribution rate determiner 16 determines whether or not the amount of distribution to the n-th battery is smaller than ½ of the MEP, and is addable to the 1 to (n−1)-th batteries (step S19). When this condition is satisfied (step S19: YES), the amount of distribution to the n-th battery is additionally distributed and transferred at the rate of the remaining amount (MPP−MEP) of each battery, to the (n−1) number of batteries having already undergone the distribution (step S20). Conversely, when the condition is not satisfied (step S19: NO), the charge/discharge instruction value is re-distributed to 1 to n-th batteries at the rate of the MEP of each battery (step S21). After the completion of the step S20 or the step S21, the battery (including the PCS) that has zero distribution power is transitioned to the power saving mode (step S22), and the process is finished.

(Effect)

Effects of this embodiment will be explained below separately for a deterioration suppression effect that utilizes the charge necessity characteristic, and for an accomplishment of a high charge/discharge efficiency that utilizes the charge/discharge efficiency characteristic.

(Deterioration Suppression Effect Utilizing Charge Necessity Characteristic)

Figure 10:
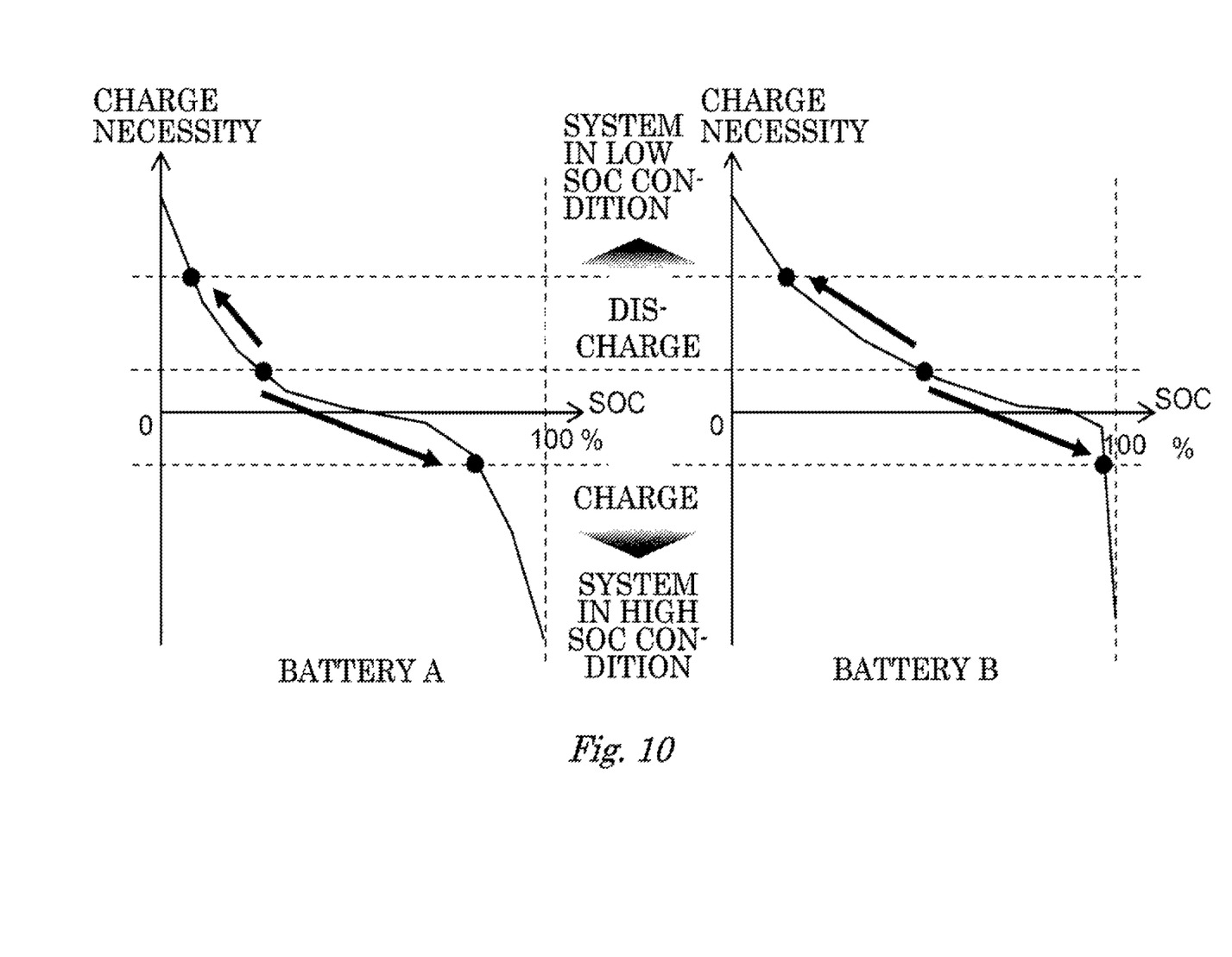
FIG. 10 is a graph for explaining a deterioration suppression effect that utilizes a charge necessity characteristic.

The distribution rate determiner 16 of the battery controller 1 according to this embodiment distributes charge power in preference to the battery that has a high charge necessity when the whole system is in the charging direction. That is, as illustrated in FIG. 10, since the battery located at the higher position in the charge necessity curve is shifted to the lower position, this distribution action works so as to make the charge necessity values of all batteries 3-1 to 3-30 uniform. Conversely, when the whole system is in the discharging direction, the discharge power is distributed in preference to the battery that has a low charge necessity. That is, since the battery located at the lower position in the charge necessity curve is shifted to the higher position, this distribution action works so as to make the charge necessity values of all batteries 3-1 to 3-30 uniform.

As a result of such action, when the SOC of a whole system fluctuates, as illustrated in FIG. 10, a dotted line in the horizontal direction moves up and down, and in accordance with this movement, the SOC position of each of the batteries 3-1 to 3-30 is shifted as an intersection point between the dotted line and the charge necessity curve. That is, the charge necessity values of all batteries 3-1 to 3-30, i.e., the height positions in the vertical direction of the graph is shifted so as to be uniform.

Hence, by individually setting the charge necessity characteristic of each of the batteries 3-1 to 3-30, it becomes possible to specify the originally proper SOC position (SOC distribution) of each battery to each SOC point as a whole system. For example, in the example case illustrated in FIG. 10, since a battery B has a characteristic that advances the deterioration within the low SOC region, the charge necessity curve becomes the one as illustrated in the figure. Hence, when in the high SOC condition as the system, the SOC position is located at a position of substantially fully charged condition, and even if it is in the low SOC condition as the system, the SOC condition that is relatively higher than a battery A is always maintainable.

Through the above-explained action, an operation that enable to avoid, as much as possible, the stay time in the SOC region where a deterioration is fast is realizable in consideration of the deterioration speed characteristic of each battery to the SOC of the batteries 3-1 to 3-30.

(Accomplishment of High Charge/Discharge Efficiency Utilizing Charge/Discharge Efficiency Characteristic)

Next, an explanation will be given of a reduction of loss by the distribution of charge/discharge power to each of the batteries 3-1 to 3-30 which utilizes the charge/discharge efficiency characteristic, i.e., an accomplishment of the high charge/discharge efficiency.

Figure 11:
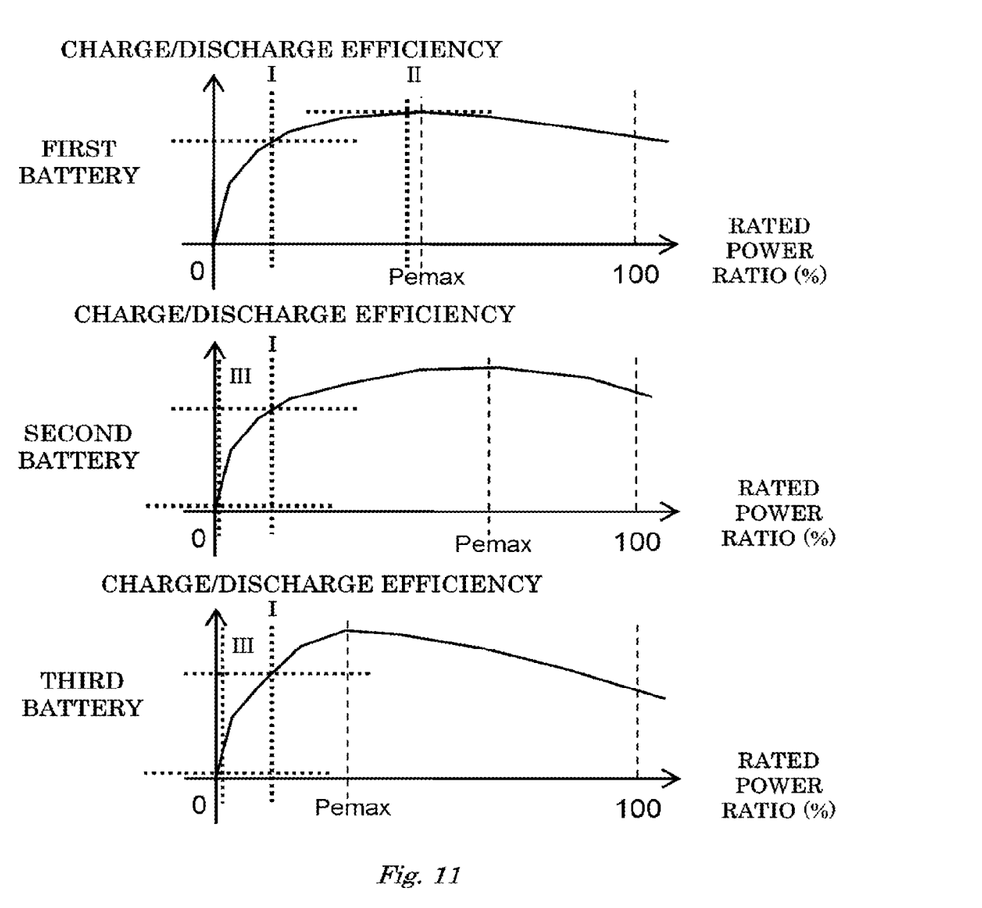
FIG. 11 is a graph for explaining how to accomplish a high charge/discharge efficiency that utilizes a charge/discharge efficiency characteristic.

As illustrated in FIG. 11, when, for example, the charge/discharge power instruction value of a whole system at a certain time point to a system that includes three batteries (first battery, second battery, and third battery) is a value that can be met by only one battery (i.e., at the time of low-load operation), if, for example, power is evenly distributed to the three batteries, all batteries are operated under a low efficient condition (dotted line I in FIG. 11).

Conversely, when the distribution is performed at the maximum efficiency point power as much as possible in the order of preference defined in view of the aforementioned deterioration suppression, the power value is distributed to only a small number of batteries at substantially maximum efficiency point (Pemax) power (dotted line II of first battery in FIG. 11), while at the same time, the remaining battery group (second battery and third battery) with zero distribution power (dotted line III) is transitioned to, for example, the stand-by mode that has low power consumption, and this enables the self-consumption power of a whole system to be reduced.

Therefore, the higher charge/discharge efficiency than the even distribution to all batteries 3-1 to 3-30, i.e., a reduction of loss is realizable.

Other Embodiments (1) In the above-explained embodiment, the charge necessity characteristic is explained as the characteristic that can be expressed by a two-dimensional graph (see FIG. 4 and FIG. 10) relative to the SOC, but in general, not only the SOC but also a temperature largely affect a battery deterioration. Accordingly, the charge necessity characteristic can be expressed by a three-dimensional graph that can meet both parameters which are the SOC and the temperature. In this case, however, the temperature at an arbitrary time point is defined unambiguously, and thus by utilizing the charge necessity-characteristic value that is expressed by a two-dimensional graph which meets the temperature, the same process as the distribution method illustrated in FIG. 9 is applicable.

(2) The plural batteries of the embodiment can be various batteries. As for the type, for example, in addition to lithium-ion batteries, the type is not limited to nickel hydride batteries, lead batteries, etc., and it is also unnecessary that the capacity (Wh) and output (W) of the respective batteries are coincide.

(3) When each battery is, for example, under a low-temperature condition, it is expected that, depending on the situation, charging/discharging up to the rated power is difficult. In such a case, when the "rated power" explained in the embodiment is changed to the "maximum chargeable/dischargeable power", the distribution method explained in the embodiment is directly applicable. At this time, the "maximum efficiency point power" is changed to the "maximum efficiency point within the chargeable/dischargeable range".

(4) In the aforementioned embodiment, the method of distributing charge/discharge power was explained, but instead of the charge/discharge power, a current value may be applied.

(5) The explanation was given of the deterioration suppression effect that utilizes the charge necessity characteristic when the number of batteries is two with reference to FIG. 10, and the explanation was given of the accomplishment of the high charge/discharge efficiency that utilizes the charge/discharge efficiency characteristic when the number of batteries is three with reference to FIG. 11. However, the number of batteries is optional, and it is apparent that the same effects can be accomplished even if the number of batteries is increased.

(6) Although several embodiments of the present disclosure were explained above, those embodiments are merely presented as examples, and are not intended to limit the scope of the present disclosure. Those embodiments can be carried out in other various forms, and various omissions, replacements, and modifications can be made thereto without departing from the scope of the present disclosure. Such embodiments and modified examples thereof are within the scope and spirit of the present disclosure, and are also within the scope of the appended claims and the equivalent range thereto.

The invention claimed is:

1. A secondary battery system comprising:
a plurality of batteries individually controllable for charging/discharging;
a plurality of charging/discharging devices each connected with the corresponding battery, and performing charging/discharging to the connected battery; and
a battery controller distributing, to each of the charging/discharging devices, a charge/discharge power value or a current value as a whole system at a fixed cycle or at an arbitrary timing,
the battery controller comprising:
a preference order calculator setting a preference order to the plurality of batteries at each time point based on a deterioration characteristic of each battery related to an SOC thereof; and
a distribution rate determiner distributing the charge/discharge power value or the current value to the charging/discharging devices in accordance with the preference order,
a charge-necessity-value calculator calculating a charge necessity value based on a charge necessity characteristic, the charge necessity characteristic being on a basis of a deterioration speed of the battery relative to the SOC thereof at the time point, and the deterioration speed being the deterioration characteristic of each battery.

2. A method of distributing charge/discharge power, comprises:
a plurality of batteries individually controllable for charging/discharging;
a plurality of charging/discharging devices each connected with the corresponding battery, and performing charging/discharging to the connected battery; and
a battery controller distributing, to each of the charging/discharging devices, a charge/discharge power value or a current value as a whole system at a fixed cycle or at an arbitrary timing,
wherein the battery controller sets a preference order to the plurality of batteries at each time point based on a deterioration characteristic of each battery related to an SOC thereof, and to distribute the charge/discharge power value or the current value to the charging/discharging devices in accordance with the preference order,
wherein a charge necessity characteristic based on a deterioration speed of the battery relative to the SOC thereof at the time point is applied as the deterioration characteristic of each battery.

3. The charge/discharge power or current, distribution method according to claim 2, wherein a characteristic value proportional to a derivative value of a deterioration speed characteristic of the battery relative to the SOC thereof is applied as the charge necessity characteristic of each battery.

4. The charge/discharge power or current, distribution method according to claim 2, wherein a charge necessity characteristic based on a deterioration speed relative to the SOC of each battery and a temperature thereof at the time point is applied as the deterioration characteristic of each battery.

5. The charge/discharge power or current, distribution method according to claim 4, wherein a characteristic value proportional to a derivative value of a deterioration speed characteristic of the battery relative to the SOC thereof is applied as the charge necessity characteristic of each battery.

6. The charge/discharge power or current, distribution method according to claim 2, wherein in the distribution of the charge/discharge power value to the respective charging/discharging devices in accordance with the preference order, the charge/discharge power value is distributed to the respective charging/discharging devices based on an efficiency characteristic to charge/discharge power of the battery and the charging/discharging device.

7. The charge/discharge power or current, distribution method according to claim 6, wherein in the distribution of the charge/discharge power value to the respective charging/discharging devices in accordance with the preference order, when a total value of maximum chargeable/dischargeable power values (MPP) of all batteries is equal to or smaller than a charge/discharge instruction value of a whole system at the time point, the respective maximum chargeable/dischargeable power values (MPP) are distributed to all batteries.

8. The charge/discharge power or current, distribution method according to claim 7, wherein in the distribution of the charge/discharge power value to the respective charging/discharging devices in accordance with the preference order, when a charge/discharge instruction value of a whole system at the time point is smaller than a total value of maximum chargeable/dischargeable power values (MPP) of all batteries, and is equal to or larger than a total value of maximum efficiency point power values (MEP) of all batteries, the respective MEPs are once distributed to all chargeable/dischargeable batteries, and a remaining not distributed yet is additionally distributed to each battery having already undergone the distribution at a rate of remaining amount (MPP−MEP).

9. The charge/discharge power or current, distribution method according to claim 2, wherein, as a result of the charge/discharge power distribution, the battery that has zero distribution amount is transitioned to a power saving mode that has a smaller power consumption than at a time of performing charging/discharging.

10. The charge/discharge power or current, distribution method according to claim 6, wherein in the distribution of the charge/discharge power value to the respective charging/discharging devices in accordance with the preference order, when a charge/discharge instruction value of a whole system at the time point is smaller than a total value of maximum chargeable/dischargeable power values (MPP) of all batteries, and is equal to or larger than a total value of maximum efficiency point power values (MEP) of all batteries, the respective MEPs are once distributed to all chargeable/dischargeable batteries, and a remaining not distributed yet is additionally distributed to each battery having already undergone the distribution at a rate of remaining amount (MPP−MEP).

11. The charge/discharge power or current, distribution method according to claim 6, wherein in the distribution of the charge/discharge power value to the respective charging/discharging devices in accordance with the preference order, when a charge/discharge instruction value of a whole system at the time point is smaller than a total value of maximum efficiency point power values (MEP) of all batteries, the distribution is performed to the chargeable/dischargeable batteries in an order of the higher preference at a rate of MEP, the number of the chargeable/dischargeable batteries making a ratio between distributed power and the MEP closest to 1.

* * * * *